United States Patent Office 3,153,573
Patented Oct. 20, 1964

3,153,573
METHOD OF PREPARING ALKALI METAL SALTS OF PHOSPHORAMIDIC ACID
Morris L. Nielsen, Dayton, Ohio, assignor to Monsanto Company, a corporation of Delaware
No Drawing. Filed Dec. 2, 1959, Ser. No. 856,657
4 Claims. (Cl. 23—101)

The present invention relates to new compositions of matter and to a process for the manufacture of phosphorus nitrogen compounds such as disodium phosphoramidate, as well as other salts such as dipotassium phosphoramidate and their N-substituted alkali metal derivatives such as N-sodium disodium phosphoramidate.

It is an object of the invention to prepare various alkali metal salts of phosphoramidic acid, which are of utility as corrosion inhibitors and also as intermediates in the preparation of sequestering agents and alkaline builders for detergent compositions.

It is also an object to prepare novel N-substituted alkali metal derivatives of the phosphoramidates. Another object of the invention is to prepare the two said types of compounds in the same process and to control the relative proportions thereof.

The reactants employed in the present invention are alkali phosphates such as sodium, lithium, potassium, rubidium or cesium metaphosphates or glassy phosphates of $M_2O/P_2O_5$ mole ratio of approximately 1.0, where M is Na, Li, K, Rb, or Cs, and an alkali amide such as sodium amide. It has been found that the desired compounds are obtained in high yield when this reaction is carried out at a temperature of from 100° C. to 300°, or preferably from 100° C. to 250° C. In this temperature range the numerous possible by-products and co-products which are theoretically possible have been found to be minimized.

The alkali phosphate compound and the alkali amide are employed in the general proportion of from 1.5 to 4.5 or preferably 2.0 to 4.0 gram moles of amide per gram atom of phosphorus. A specific preferred example is 2.0 gram moles of amide per gram atom of phosphorus.

The present invention is based upon the reaction of the alkali metaphosphate or glassy phosphate ($M_2O/P_2O_5$ approximately 1) with alkali amide to yield a mixture of two products. It has also been found that the proportion of the two co-products (e.g., for sodium), N-sodium disodium phosphoramidate and disodium phosphoramidate, can be controlled to yield a preponderance of substantially all of one or the other component.

The products thus have the general formula

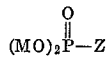

where Z is selected from the group consisting of

—NHLi        —NHRb
—NHNa       —NHCs
—NHK         —NH$_2$ and M is Na, Li, K, Rb or Cs.

The compounds

(where M and M′ are the same or different members of the group consisting of Na, Li, K, Rb or Cs) are new compounds existing as high melting white solids which react vigorously with water and moderately with alcohol. These compounds, as exemplified by N-sodium disodium phosphoramidate, are useful as desiccating agents and as intermediates for the manufacture of polymers.

The invention also includes the step of directing the relative proportions of the two co-products toward high alkali phosphoramidate content by quenching the reaction mixture in a hydroxyl solvent. The term, hydroxyl solvent, as employed herein includes water and the alcohols and glycols which boil from 50° C. to 250° C. and also water-alcohol mixtures in all proportions. Other dilute alcohols, e.g., 5% to 95% alcohol with an inert solvent such as benzene may also be employed so as to moderate the reaction and control its endpoint at the desired proportion.

In addition to the use of benzene and other inert solvents mixed with the hydroxyl solvent, other ways of obtaining a mixture of any desired proportion of the two co-products are by regulation of the time and temperature of quenching to control the hydrolysis or alcoholysis of the N-metal form to the amide form. For example, a short time or a low temperature favors a high proportion of the N-metal form. The alcoholysis or hydrolysis may be conducted using a liquid medium or a vapor phase medium such as vaporized alcohol or water. For the preparation of the alkali phosphoramidate, either alcohols or water or mixtures thereof may be employed so that complete conversion of the N-metal compounds having the radicals —NHLi, —NHNa, —NHK, —NHRb, —NCHs to the —NH$_2$ form results.

The primary reaction between the phosphates and the alkali amides may be conducted with or without a fluid medium. The solid reactants undergo reaction readily in the absence of a solvent, such as by the use of a low melting flux of sodium and potassium amides. Other salts such as sodium or potassium phenoxide may also be added. Conventional liquid media such as kerosene may also be used.

The following examples illustrate specific embodiments of the invention:

*Example 1*

A mixture of 9.8 g. sodium trimetaphosphate (NaPO$_3$)$_3$, anhydrous, and 16 g. NaNH$_2$—KNH$_2$ (proportions 60–40 by weight) was ground intimately in a dry-box. It was heated in a glass flask under vacuum at 140° C. for 18 hrs. during which time ammonia was evolved and the solids sintered together. The reaction mixture was cooled, flooded with denatured ethanol to quench the unreacted alkali metal amides, and convert the N-sodium disodium phosphoramidate to the anhydrous disodium phosphoramidate, which was filtered off. Analysis of the solids by nuclear magnetic resonance showed a high concentration (45%) of disodium phosphoramidate. As a means of purification the solids were dissolved in water, acidified with acetic acid and chilled to obtain pure sodium hydrogen phosphoramidate, NaHPO$_3$NH$_2$. To convert to the disodium phosphoramidate hexahydrate, the sodium hydrogen salt was dispersed in water, made strongly alkaline with excess sodium hydroxide and precipitated with ethanol. Yield 6.3 g. (26%). To prepare anyhdrous disodium phosphoramidate, the hexahydrate was dehydrated at less than 15 mm. pressure at temperatures of 60–110° C.

*Example 2*

The proportions of reactants were mixed as in Example 1 but in this experiment, they were heated at 225° C. The yield of disodium phosphoramidate was 8.7 g. (36%). It was identified by X-ray diffraction as the hexahydrate.

*Example 3*

A mixture of 9.0 g. potassium metaphosphate (Kurrol's salt), 27 g. potassium amide and 25 g. potassium phenoxide was heated at 175° C. for 18 hours under vacuum, and processed as in Example 1. A quantity of pure dipotassium phosphoramidate, $K_2PO_3NH_2$, was obtained.

*Example 4*

The preparation of N-sodium disodium phosphoramidate was conducted by using 10 g. sodium trimetaphosphate $(NaPO_3)_3$, and 20 g. $NaNH_2$, mixed in a drybox, and heated in a glass flask under vacuum at 190° C. for 16 hours. The N-sodium disodium phosphoramidate was purified by solvent extraction using liquid ammonia. The identity of the product was established by nuclear magnetic resonance measurements.

What is claimed is:

1. Process for the production of N-alkali dialkali phosphoramidate selected from the group in which the alkali is sodium, lithium, potassium, rubidium and cesium which comprises heating together a mixture of an alkali amide selected from the group in which the alkali is sodium, lithium, potassium, rubidium and cesium, and a phosphate selected from the group consisting of alkali phosphates of $M_2O/P_2O_5$ mole ratio approximately 1.0 where M is selected from the group consisting of sodium and potassium, the proportion of the amide being from 1.5 to 4.5 gram moles per gram atom of phosphorus, at a temperature of 100° C. to 300° C.

2. Process for the production of dialkali phosphoramidate selected from the group in which the alkali is sodium, lithium, potassium, rubidium and cesium which comprises heating together a mixture of alkali amide selected from the group in which the alkali is sodium, lithium, potassium, rubidium and cesium and a phosphate selected from the group consisting of alkali phosphates of $M_2O/P_2O_5$ mole ratio approximately 1.0, the proportion of the amide being about two gram moles per gram atom of phosphorus at a temperature of 100° C. to 300° C. to obtain a mixture of dialkali phosphoramidate and N-alkali dialkali phosphoramidate, and transforming the said N-alkali dialkali phosphoramidate which is present to dialkali phosphoramidate by quenching the said reaction mixture in a solvent selected from the group of water and the alcohols and glycols which boil from 50° C. to 250° C.

3. Process for the production of N-sodium disodium phosphoramidate which comprises heating together a mixture of an alkali amide selected from the group in which the alkali is sodium, lithium, potassium, rubidium and cesium, and sodium phosphates of $M_2O/P_2O_5$ mole ratio approximately 1.0 where M is selected from the group consisting of sodium and potassium, the proportion of the amide being from 1.5 to 4.5 gram moles per gram atom of phosphorus, at a temperature of 100° C. to 300° C.

4. Process for the production of disodium phosphoramidate which comprises heating together a mixture of sodium amide and sodium phosphates of $Na_2O/P_2O_5$ mole ratio approximately 1.0, the proportion of the amide being about two gram moles per gram atom of phosphorus, at a temperature of 100° C. to 300° C. to obtain a mixture of disodium phosphoramidate and N-sodium disodium phosphoramidate, and transforming the said N-sodium disodium phosphoramidate which is present to disodium phosphoramidate by quenching the said reaction mixture in a solvent selected from the group of water and the alcohols and glycols which boil from 50° C. to 250° C.

References Cited in the file of this patent

Mellor: Comprehensive Treatise on Inorganic and Theoretical Chemistry, vol. 8, 1928, pages 257–258, Longmans, Green and Company.